S. SHEPHERD.
Peanut Cleaner.
No. 18,302.
Patented Sept. 29, 1857.
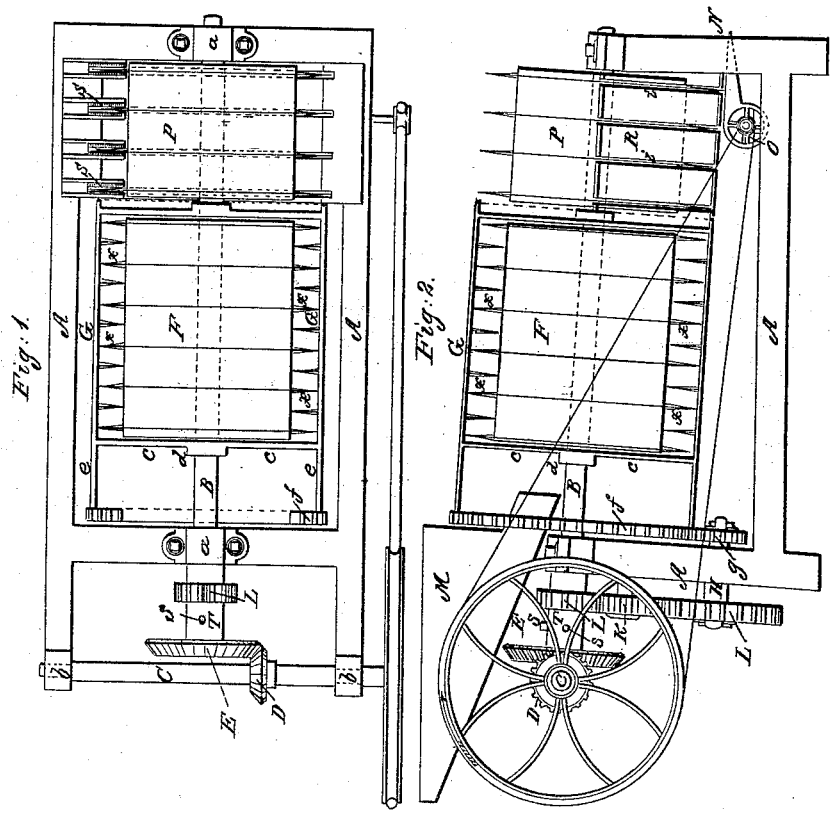
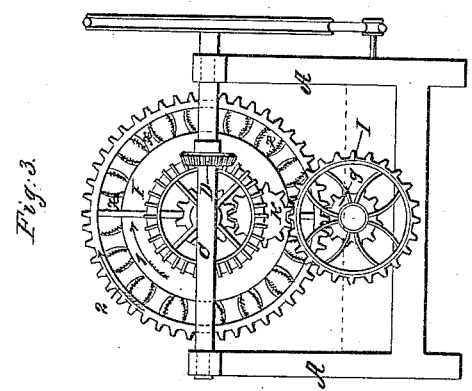

UNITED STATES PATENT OFFICE.

SAMUEL SHEPHERD, OF NASHUA, NEW HAMPSHIRE.

METHOD OF STEMMING AND POLISHING PEANUTS.

Specification of Letters Patent No. 18,302, dated September 29, 1857.

*To all whom it may concern:*

Be it known that I, SAMUEL SHEPHERD, of Nashua, in the county of Hillsboro and State of New Hampshire, have invented a new and useful Machine for Cleaning and Polishing Peanuts, of which the following is a full, clear, and exact description, reference being had to the accompanying drawings, making part of this specification, in which—

Figure 1 is a plan; Fig. 2 a longitudinal elevation a portion of the cylinder being removed in both views; Fig. 3 an end elevation.

When peanuts are beaten off the vines a small stem adheres to each nut, which it becomes necessary to remove to fit the nuts for market—to accomplish this and to clean and polish the nuts is the object of the machine which I have invented; and that others skilled in the art may understand my invention I will proceed to describe the manner in which I have carried it out.

In the drawings A, is the frame of the machine in suitable bearings at $a$, upon which is supported the shaft B, running longitudinally through the machine. At one end of the frame is placed transversely the driving shaft C' having bearings at $b$. On this shaft is a beveled cog wheel D which engages with a wheel E, on the end of the shaft B. A cylinder F is secured on the shaft B and revolves with it in the direction of the arrow 1 in Fig. 3. The periphery of this cylinder is furnished with teeth, $x$, of a peculiar form (shown in Fig. 3) that is tapering toward their point, somewhat curved or sickle shaped, with a notched or serrated edge on the advancing side.

A hollow cylinder or concave G, surrounds the cylinder F. It is furnished on its inner surface with teeth similar to those on the cylinder F, but curved in a counter direction, this cylinder is supported at each end by arms $c$, radiating from hubs $d$, which embrace the shaft B, it is prolonged toward the front end as at $e$, where there are no teeth; it has secured to its end a cog wheel $f$, which engages with a pinion $g$ on a short shaft H. A wheel I on this shaft engages with an intermediate gear K, and it with a gear L, on the shaft B, by this arrangement of gearing the cylinder G, is driven in the direction of the arrow 2, Fig. 3, or contrary to the other cylinder. The teeth of the two cylinders travel in circles at such a distance apart that they do not only crush the peanuts, but their rough curved edges catch and tear off the stems from the nuts while the rolling motion cleans and polishes them. The shaft B is placed at a proper inclination descending from the front to the rear of the machine for the purpose of feeding the nuts through.

In operating, the peanuts as they are beaten from the vines are run from the hopper M, into the inside of the cylinder G. When the two cylinders being revolved in opposite directions as before explained the nuts are rolled over between the cylinders and their stems are torn off by the teeth upon the cylinders F and G, the clean nuts pass over a suitable apron and out of the machine at N, falling over a current of air from a fan O, which is driven by a belt from the main shaft. As at times the stems do not adhere so tenaciously to the nuts, it is not necessary at all times to revolve both cylinders together; by removing the intermediate gear K, the cylinder F may be revolved within the cylinder G, without turning the latter; or the outer cylinder may be revolved without the inner one, to accomplish this I have adopted the following arrangement, on the shaft B beyond the supporting cross brace of the frame is placed a sleeve T, on which the gear L, is secured—it is held to the shaft B by the screws S,—when these are tightened the shaft B revolves with the sleeve T, but when they are loosened the sleeve revolves without communicating motion to the cylinder E. At the right hand of the drawings, or what may be termed the lower end of the machine is shown a modification of my machine. P is a cylinder on the shaft B furnished with rows of teeth similar to those on the cylinder F, beneath is placed a semicircular box or concave R, in which are cut slits $i$ through which travel the teeth of the cylinder P, as it revolves; a sufficient space being left between the cylinder and the concave for the passage of the nuts which are fed in at one end and pass out at the other. As in the former instance, the stems being dragged by the teeth through the slits and torn from the nuts. The teeth are cleaned by passing through a series of brushes S, secured to the frame on one side in the path of the teeth.

I lay no claim to any specific machine except when used for the purpose herein described, what I do claim as my invention and desire to secure by Letters Patent is—

Stemming and polishing peanuts in the manner herein set forth by means of the machinery above described or the substantial equivalent thereof.

SAMUEL SHEPHERD.

Witnesses:
THOS. R. ROACH,
THOS. L. GLOVER.